United States Patent [19]

Parkins

[11] Patent Number: 4,498,017

[45] Date of Patent: Feb. 5, 1985

[54] GENERATING POWER FROM WIND

[76] Inventor: William E. Parkins, 20120 Wells Dr., Woodland Hills, Calif. 91364

[21] Appl. No.: 487,099

[22] Filed: Apr. 21, 1983

Related U.S. Application Data

[63] Continuation-in-part of Ser. No. 450,462, Dec. 16, 1982, , which is a continuation-in-part of Ser. No. 385,330, Jun. 4, 1982.

[51] Int. Cl.$^3$ .................. F03D 17/02; F03D 49/02; F04B 49/00
[52] U.S. Cl. .................................. 290/44; 290/55; 417/35; 416/44 A
[58] Field of Search .................. 290/44, 55; 322/35; 417/1, 35, 324, 429; 416/44 A

[56] References Cited

U.S. PATENT DOCUMENTS

| | | |
|---|---|---|
| 1,001,176 | 2/1911 | Snee . |
| 1,010,591 | 12/1911 | Clements . |
| 1,366,844 | 1/1921 | Snee, Jr. . |
| 3,269,121 | 8/1966 | Bening . |
| 3,952,723 | 4/1976 | Browning . |
| 4,013,702 | 6/1977 | Burnett et al. . |
| 4,149,092 | 4/1979 | Cros . |
| 4,274,010 | 6/1981 | Lawson-Tancred . |
| 4,280,061 | 7/1981 | Lawson-Tancred . |

Primary Examiner—J. V. Truhe
Assistant Examiner—Shelley Wade
Attorney, Agent, or Firm—Lyon & Lyon

[57] ABSTRACT

A wind machine turns a shaft to activate a multi-stage positive displacement pump having intake and discharge means respectively coupled to intake and discharge fluid lines in a recirculating hydraulic system. Control means regulates the operative positions of the intake means, discharge means or separate idling means to remove selected stages from effective pumping while at the same time fluid passes into and from the selected stages. The stages can be of different capacities and selected groups or all of them may be periodically idled by a common or individual idling means. Constricting means is located in the common discharge line from all stages and can be additionally located in each discharge line from each stage. Automatic control of torque on the wind rotor shaft by the idling and constricting means permits the rotor to start to rotate, continue to rotate at a speed for maximum efficiency conversion of the wind power into hydraulic power over any desired range of wind speeds, rotate as limited to any specified maximum rates rotation during high wind speeds, and to stop and lock if the wind speed becomes excessive. The hydraulic system can parallel-connect a number of wind machines to drive a single turbine installation to produce useful power.

30 Claims, 9 Drawing Figures

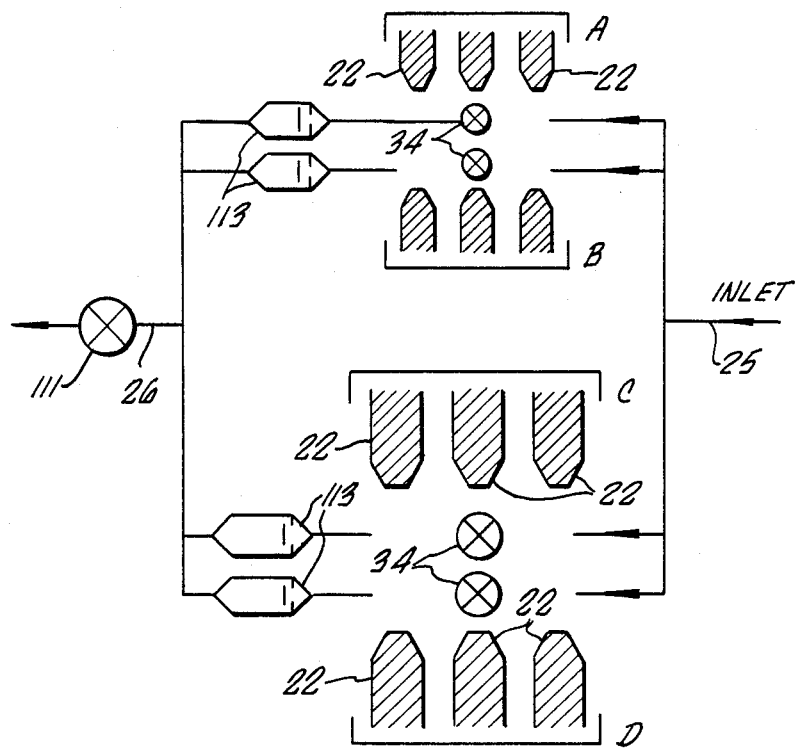
FIG_8_
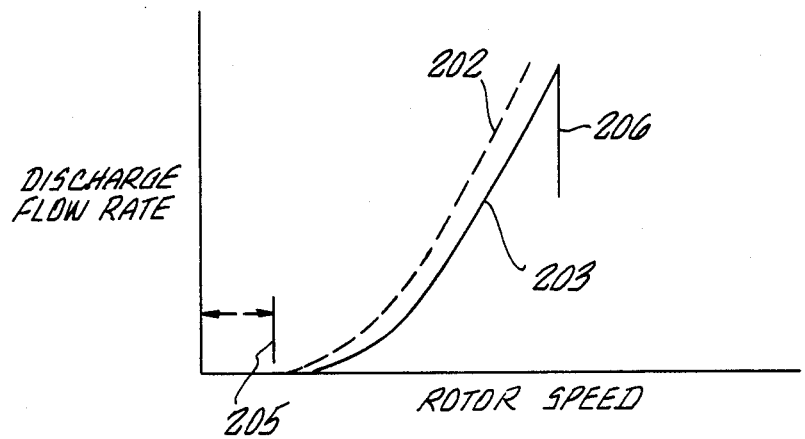
FIG_9_

GENERATING POWER FROM WIND

RELATED APPLICATION

This application is a continuation-in-part of my patent application Ser. No. 450,462 filed Dec. 16, 1982 which is a continuation in part of patent application Ser. No. 385,330 filed June 4, 1982 and the contents contained in both the prior applications are incorporated by reference herein.

BACKGROUND OF THE INVENTION

This invention relates to power generation through a wind machine. In particular the invention is directed to regulating the rotation of a wind responsive rotor of a wind machine during its normal operating phase and during startup and during wind overspeed conditions.

Among the many problems associated with power generation from wind is the difficulty encountered by variable wind conditions which results in a mechanical output from the wind rotor also being variable thereby making it difficult to obtain useful conversion of the mechanical energy into an electrical generator.

Many solutions have been suggested to overcome this problem including the provision of a variable pitch wind rotor whereby the pitch of the rotor will vary according to changes in wind speed. Mechanical and electrical arrangements to effect this variability, however are complicated, and thus it is preferable to employ a fixed pitch rotor.

Another manner of overcoming the variability of the wind speed has been suggested in the feeding of the mechanically generated energy from the rotor to the electrical generator through a hydraulic system which has the ability to accumulate energy and to subsequently release it.

These problems were realized and have been sought to be resolved in the systems for instance in U.S. Pat. No. 4,280,061 (Lawson-Tancred) and U.S. Pat. No. 4,274,010 (Lawson-Tancred). In the systems of both of these patents, however, there is still omitted the major need of providing a simple manner for conveying the hydraulic power effectively to the electric generator. Both these patents propose multiple pumps in the hydraulic feed line from the rotor with one or more, but not all, of the pumps being bypassed from the system as the rotor speed changes, without direct consideration of the wind speed. Additionally in U.S. Pat. No. 4,274,010 an accumulator piston cylinder arrangement is provided downstream of the multiple pumps for effectively accumulating and releasing energy. The output from the pumps is at a variable pressure and, therefore, of necessity, complex and multiple additional equipment is provided to ensure that the hydraulic power transmitted to turn the generator can be beneficially utilized. For instance in U.S. Pat. No. 4,280,061, a variable angle swash plate motor is used downstream of the multiple pumps associated with the rotor and receives the variable pressure hydraulic output from the multiple pumps to effect this transition of power. Multiple control systems are used to regulate the operation of the multiple pumps, the piston and cylinder accumulator, and the variable hydraulic motor. Additionally the pump means employed require relatively complex constructions, and by-passing of unneeded pumps necessitates an overall design and expense requirement for such multiple pumps which should be avoided.

Another earlier attempt at trying to resolve these problems is disclosed in U.S. Pat. No. 2,539,862 (Rushing), and this system also employed hydraulic accumulators for storing energy and means for electromagnetically engaging different numbers of different sized pumps.

Inherently these systems only go part of the way to providing a practical, economical and viable means for utilizing the variable wind power on the rotor.

Consideration, has to the Applicant's knowledge not provided effective means for regulating a fixed pitch rotor and for controlling the rotor in overspeed wind conditions which can result in destruction of the wind machine, and which is obviously essential to solve and thereby provide an overall efficient wind power generating system under all wind conditions.

SUMMARY OF THE INVENTION

There is accordingly a need for regulating the rotation of a rotor of a wind machine and for providing from a coupled pump a substantially constant hydraulic pressure which can be simply transmitted to a hydraulic system for, in turn, activating the hydraulic to mechanical energy conversion associated with a generator. Energy accumulation should be unnecessary. There is also a need to ensure effective starting of a wind machine and to provide means to brake the rotor of a wind machine during overspeed wind conditions.

The invention provides a multi-stage pump with intake and discharge means respectively connected to the intake fluid line and discharge fluid line so that each stage of the pump can pump fluid between the intake line and discharge line. Control means regulates the operative positions of the intake or discharge means to remove, at least partially, one or more or all selected stages from effective pumping of fluid between the intake line and discharge line while at the same time fluid passes into and from the selected stages. The idling of a stage can be effected by holding open either the intake or discharge means to the stage. Provisions can be made for idling more than one, and possibly all, stages of the pump by a common idling means.

A first constricting means is located in the common discharge line from all stages, and a second constricting means can be additionally located in series with each stage between the fluid intake line and the fluid discharge line. In an alternate method of idling selected stages, the control system can regulate the operative positions of this second constricting means and that of an idling means connected between the stage discharge and intake, while at the same time fluid passes into and from the selected stages.

The pressure on the fluid in the discharge line downstream of the first constricting means is retained substantially constant and at the same time the torque of the shaft means can be adjusted so that the rotor shaft speed will operate in a range assuring effective conversion of wind power to shaft power.

For a given design of wind rotor there will be a range of the speed ratio that provides for high efficiency power transfer from the wind to the rotor shaft. The speed ratio is the ratio of rotor speed to wind speed. The optimum range of speed ratio may vary somewhat with wind speed but is normally fairly constant so that the rotor speed needs to be approximately proportional to wind speed for efficient power transfer. The power coefficient, representing the fraction of power in the wind swept by the rotor that is converted into shaft power, is preferably retained above 0.1, and depending on the rotor design is above 0.2 for a speed ratio between substantially 3 and 8, when speed ratio is defined as the ratio of the rotor tip speed to wind speed.

During starting, control means idles pumping stages until the shaft rotates at a predetermined speed and thereafter engages as many stages as appropriate for the wind speed to permit effective pumping of fluid between the intake line and discharge line.

During overspeed wind conditions the control system partially closes the constricting means, preferably the first constricting means, to increase the pressure on the stages so as to prevent excessive rotor speed and to allow continued operation or alternatively to bring the rotor to a stall.

In a preferred form the pump is of a positive displacement type, and, preferably includes reciprocating pistons in cylinders. Several pumps connected in parallel can be driven by one wind machine rotor. Also, a multiplicity of wind machines may be used with the rotor driven pump or pumps at each machine connected in parallel in the fluid system. This system is preferably recirculating and incorporating a common turbine installation to convert the hydraulic power into mechanical power before returning the fluid to the wind machine pumps.

Each pump can be located in substantial close adjacency to its driving rotor so that the drive train, which may include a gear, is minimized. In a horizontal axis wind machine the pump can be located on a tower adjacent the rotor, and in a vertical axis wind machine the pump can be located in adjacency with the rotor mounting substantially at ground level.

The fluid in the system is preferably water, or may be other liquids. The fluid may also be a suitable gas.

BRIEF DESCRIPTION OF THE DRAWINGS

FIG. 8 is a diagram of an arrangement employing two double-acting triplex pumps of different capacities.

FIG. 9 is a graph illustrating control of rotor speed based on measurement of rotor speed and pump discharge flow rate.

DETAILED DESCRIPTION

Figure 1:
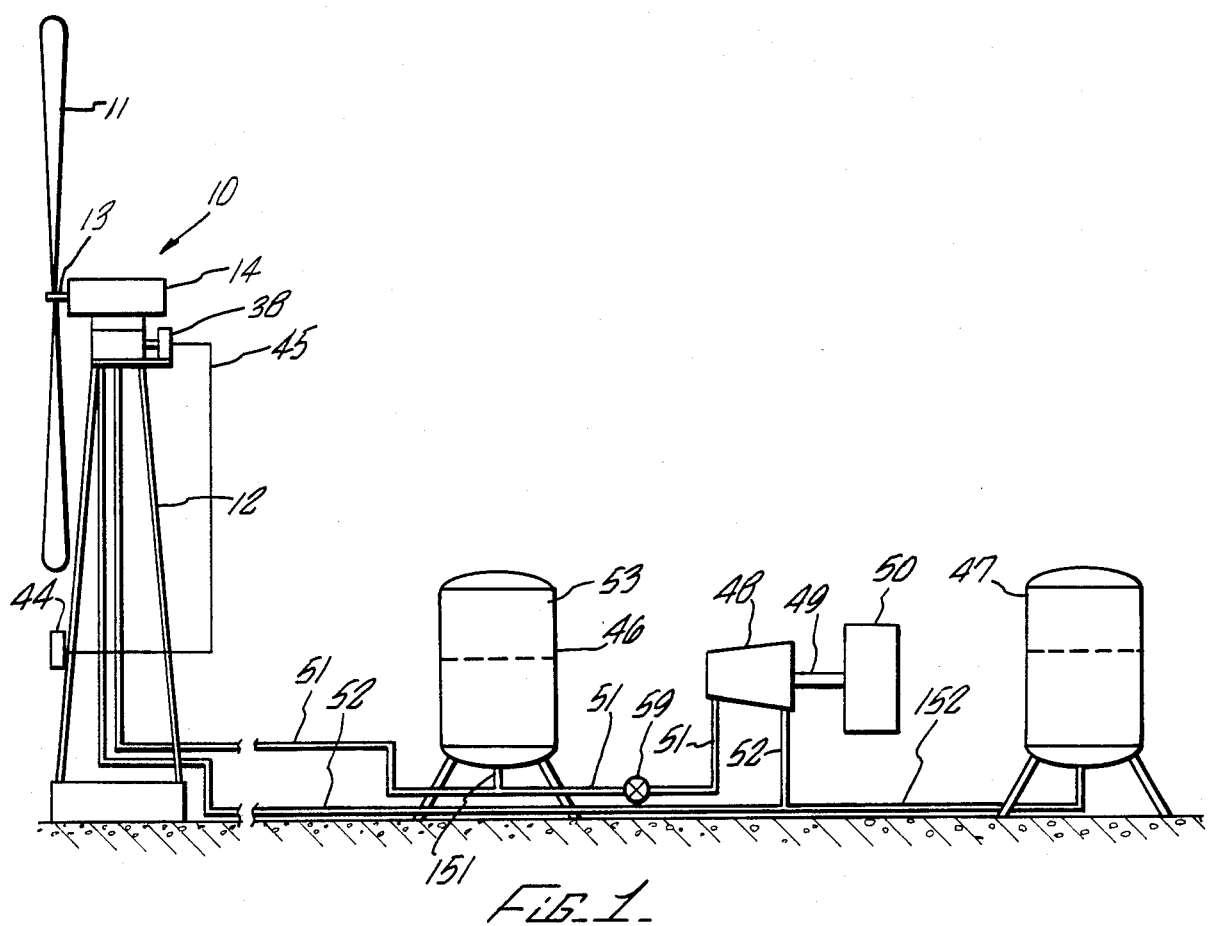
FIG. 1 is a diagrammatic view showing in elevation a wind machine with a horizontal axis rotor connected with the hydraulic system.

A wind machine 10 includes a wind responsive rotor 11 mounted on a tower 12 so that the rotational axis is in a horizontal direction. The rotor 11 is connected with a rotatable shaft means 13 which enters a gear box 14 in which the shaft 13 is supported on bearings 114. The bottom plate 15 of the gear box 14 is mounted on a bearing system 16 so that the gear box 14 can turn in a horizontal plane as determined by the wind direction. Should the direction of the wind change the surface area covered by the rotating rotor 11 will change to face the wind direction as indicated by arrow 17 so that the maximum force of the wind impinges on the rotor 11.

The shaft 13 is the first component of the rotatable shaft means, the second component being the crankshaft 18 which is directed vertically in the pump housing 19. The crankshaft 18 includes 4 crankarms 20 with a length half of the stroke of pistons 21 which are housed in cylinders 22. Each crankarm 20 drives two pistons 21, 180 degrees out of phase and there are eight pistons 21 which have eight phase angles separated by 45 degrees. Connecting rods 23 couple the crankarms 20 to the pistons 21 at two in-line vertical banks of four cylinders, one bank being slightly displaced vertically from the other. Remote ends 24 of each cylinder 22 are provided with valve arrangements which then connect with a fluid inlet line or header pipe 25 and a discharge fluid line or header pipe 26.

Control means is associated with the pump so as to regulate valve operative positions so that one or more of the selected stages 22 can be removed or added from effective pumping between the intake line 25 and discharge line 26 while fluid passes into and from the selected stage thereby to vary controllably the torque demanded by crankshaft 18 of wind rotor shaft 13. The pressure in the discharge line 26 is retained substantially constant and controlling the number of stages 22 engaged in effective pumping thereby results in changes in the torque demanded of the wind rotor 11 causing changes in its rotational speed for a given power level produced by the wind.

In use of the wind machine 10 the regulating apparatus for controlling the rotor 11 operates under normal wind conditions so that the shaft speed is caused to vary in order to assure a speed ratio that is nearly constant and within a range for efficient conversion of wind power to rotor power. As has been mentioned this optimum range of the speed ratio of rotor speed to wind speed will depend on the design of the rotor and can vary slightly with the wind speed.

Under normal operating conditions the cylinders 22 will be pumping fluid from the intake line 25 into the discharge line 26. As the wind speed drops the rotor, which provides power substantially proportional to the cube of the wind speed reduces its rotational speed and the rotation of the shaft 13 and shaft 18 will slow, since the pump is pumping against a nearly constant pressure difference.

The speed ratio also decreases and the control means 38 at this time will activate one or more of the selected cylinders 22, so that fluid is prevented from passage through the selected stage 22 to the discharge 26, however it instead passes into and from the cylinder 22 while the piston 21 continues to reciprocate. These stages 22 then pump against substantially zero head at the pressure of the header. The flow from the pump 39 and the torque required by the pump 39 is thereby reduced allowing the wind rotor to rotate faster to simultaneously increase the speed ratio to within the desired predetermined range. The rotor 11 assumes a higher rate of rotation with the power delivered by the pump 39, and the flow from the pump 39 being substantially the same.

To maintain the speed ratio within the desired range, while anticipating further reduction in wind velocity on the rotor 11, further stages of the pump 39 can be actuated so that fewer stages effectively pump and the rotor 11 can increase its rotational rate to a new value to efficiently capture the lower amount of power resulting from the lower wind speed. This can progressively continue as the wind speed drops and various stages are idled from effective pumping into the discharge line 26. At all times, however, on cylinders that have been idled the pump fluid passes into and from each cylinder 22 as the piston 21 reciprocates.

The control means 38 operates for each stage without the use of gears or clutches. With the positive displacement reciprocating piston pump an important advantage is achieved in the matching of the low rotational speeds and high torques which are characteristic of the rotating shaft 13 achieved in wind power machines and also in such pumps. Other types of positive displacement pumps can be used.

Protecting the wind machine against overspeed conditions which can result in system damage is achieved by partial closing of the constricting means in the discharge so that the pump is required to pump against an increasing pressure. As a result the rotational speed of the rotor shaft 13 decreases, and in doing so the excess energy of the rotor 11 is dissipated in a warming of the fluid passing through the cylinders 22 of the pump. As the rotor 11 is forced to a lower value of the speed ratio the rotor can be allowed to continue to operate at an inefficient speed ratio and pumping to continue. At some further lowered speed of the rotor 11 it will stall and the mechanical system will be effectively locked. When the wind speed falls to manageable levels the system can be started again by the appropriate control.

In an alternative mode of operation the wind rotor shaft speed is regulated to be substantially constant over at least one selected wind speed range. This can be effected by engaging the appropriate number of cylinders of the pump. In some cases the speed is held constant over multiple different wind speed ranges. Constriction also can be used to maintain the rotor shaft speed constant, for instance, in overspeed wind conditions.

During the braking in overspeed wind conditions stresses from high torques could occur on crankshaft 18 and this can be reduced by the choice of the bevel gear ratio for the gear 43 in the gear box 14. The ratio of the torque on shaft 18 to that on the wind rotor shaft 13 will be in the inverse ratio of their respective rotational speeds as determined by gear 43.

In the system the positive displacement pump which is mechanically simple is an advantage in wind machines since the rotor speed is relatively low. With the arragement of the positive displacement pump in close adjacency to the gear box and mounting of the rotor shaft 13 useful and simple arrangement is achieved for generating power from wind machines.

The control system 38 itself is an electrical system designed to perform substantially automatically. The critical parameter is the rotor speed to wind speed ratio and this is determined by a wind speed sensor 44 mounted on the tower 12 and connected electrically through line 45 to the controller 38, together with a rotor speed sensor at shaft 13 to determine the rotational speed of the wind rotor. The speed ratio is electronically calculated and averaged to avoid the effect of wind gusts and then is directed to a programmed control system to actuate valves at the pump.

In a different embodiment it is possible to properly regulate the rotor speed relative to the wind speed by using a measurement of fluid flow characteristic such as the flow rate in the pump discharge. Since the flow rate is proportional to the rotor power when the constricting means to prevent overspeed is not being employed, the discharge flow rate then will be approximately proportional to the cube of the wind speed and of the rotor speed for constant speed ratio and maximum efficiency. Hence the control system can be programmed to use only measurements of discharge flow rate and rotor speed to regulate the rotor under normal conditions. Accordingly, by monitoring the fluid flow rate in the line 26 it is unnecessary to employ an anemometer.

The fluid through pump 39 is a hydraulic fluid, preferably water, and the function of the pump 39 is to pump water into a hydraulic system which includes a high pressure reservoir 46 coupled with a low pressure reservoir 47 and a hydraulic to mechanical conversion turbine between the reservoirs 46 and 47. Turbine 48 translates mechanical energy to turn the shaft 49 of an electrical generator 50. The discharge pipe 26 is connected with the feed line 51 to the turbine 48 and the intake line 25 is connected with the return line 52 from the downstream side of the turbine 48. The high pressure reservoir 46 is designed so that gas within the hydraulic system can be trapped above the free surface of liquid in the reservoir as indicated by numeral 53. Thus should by chance the volume of liquid in the reservoir 46 increase slightly above its normal value as a result of a mismatch of pump and turbine flows, the gas 53 will be slightly compressed. Should by chance the volume of liquid in the reservoir 46 be decreased slightly below its normal value the degree of compression of the gas in space 53 will be slightly lowered. It is the intention to maintain the liquid volume and the pressure in reservoir 46 essentially constant at predetermined values.

The rate of flow of fluid into the turbine 48 is determined by the amount of wind rotor power being translated into discharge line 51. In order to maintain essentially constant liquid volume and pressure in reservoir 46, the turbine inlet valve 59 is continuously and automatically adjusted to maintain the liquid level in reservoir 46 close to a prescribed value. A connection pipe 151 connects the reservoir 46 with the feed line 51. Thus the flow rate through turbine 48 closely matches the pumping flow rate and the pressure of the gas in space 53 tends to remain constant. Low pressure reservoir 47 is connected to the turbine discharge and the return line to the pump by line 152, and also has a prescribed volume of liquid and pressure which will tend to remain constant since, except for small leakage, the rate of flow to the pump 39 will be equal to the rate of flow from the pump 39. In cases where the pump is mounted essentially at ground level the low pressure reservoir can be atmospheric pressure.

The generator 50 is preferably a synchronous generator thereby permitting generation of electricity at a frequency and phase compatible with the local electrical grid frequency and phase. Since the power provided by turbine 48 through shaft 49 to generator 50 will vary approximately proportionally to the flow rate through turbine 48, the electrical power fed to the grid must correspondingly vary. This will be achieved while still maintaining a sufficiently synchronous rate of rotation of generator 50 because of the frequency locking effect provided by the electrical grid. An alternative form of electric generator can be an induction generator or a D.C. generator.

Figure 2:
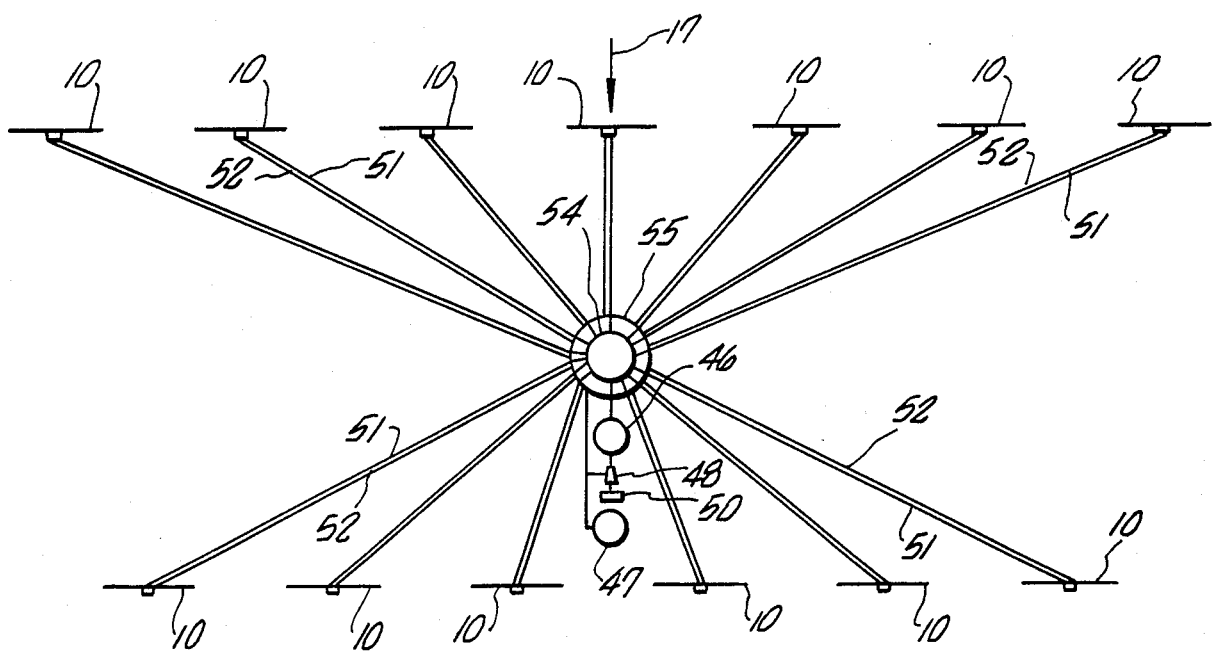
FIG. 2 is a plan diagrammatic view of a wind farm showing multiple wind machines connected through the hydraulic system to a single hydraulic to mechanical power conversion means associated with a generator.
Figure 3:
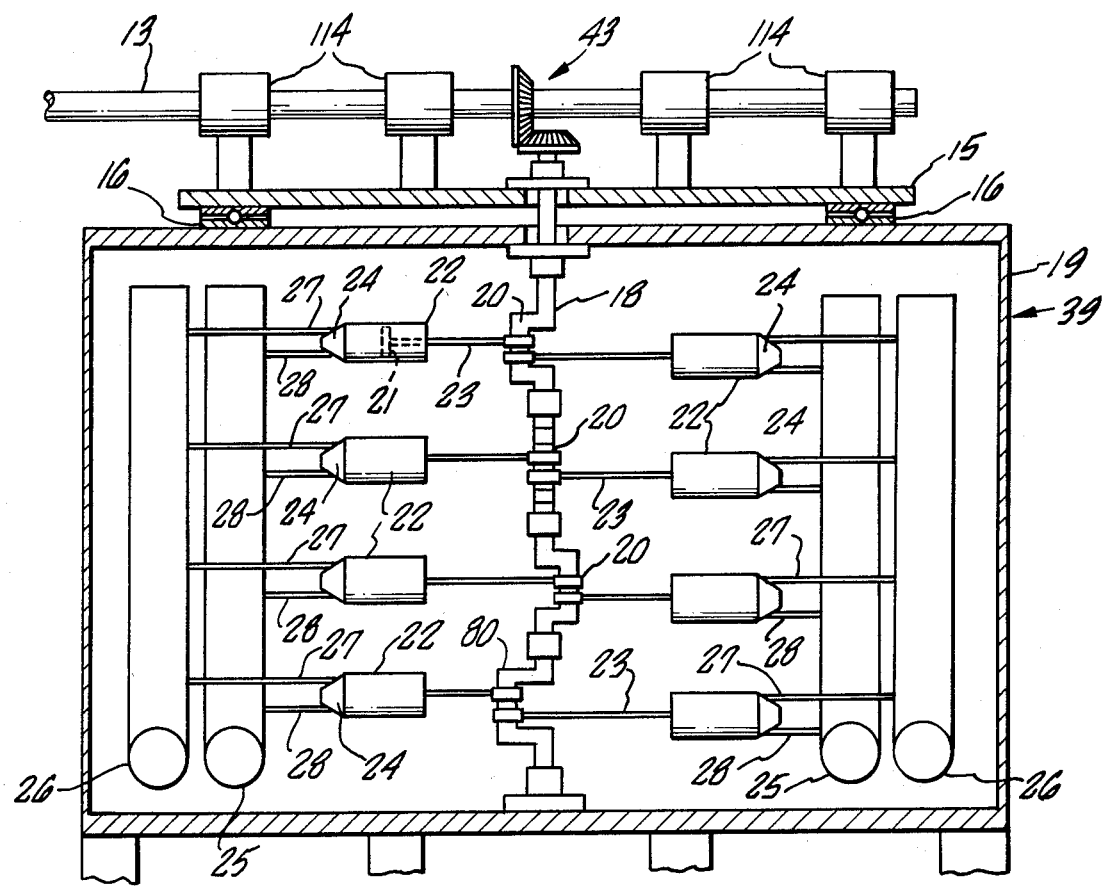
FIG. 3 is an elevational sectional view showing a positive displacement pump with cylinders in relationship to the crankshaft that is coupled through a gear to the rotor shaft.

In a preferred system using the wind machine 10 of the invention several such machines are laid out strategically on a wind farm as shown in FIG. 2, thereby to be directed towards the prevailing wind. Feed pipe 51 and return pipe 52 connect each of the wind machines with an inlet manifold 54 and outlet manifold 55 for a common electrical generating installation so that the cumulative supply of wind power over the farm area can be usefully converted in the same hydraulic system. It is preferred that the wind rotors, whether of the horizontal or vertical axis type, be of fixed pitch construction thereby adding to the overall design simplicity.

Since the power provided by the wind through the wind rotors and pumps to the common hydraulic system can vary over a wide range, the flow of fluid to the turbine 50 can also vary proportionally over a wide range. In order to assure high turbine power conversion efficiency over the wide range of possible flow rates it may be desirable to incorporate more than one turbine of differing sizes. Each would have its own automatically controlled inlet valve admitting fluid from the pump discharge line 51. The turbines could have a common or separate shafts. For the purpose of obtaining high efficiency electric power generation, one or more generators of differing sizes driven by the multiple turbine arrangement could also be employed. The control means already described to assure the generation of electrical power compatible to the local grid would still be applicable.

Figure 4:
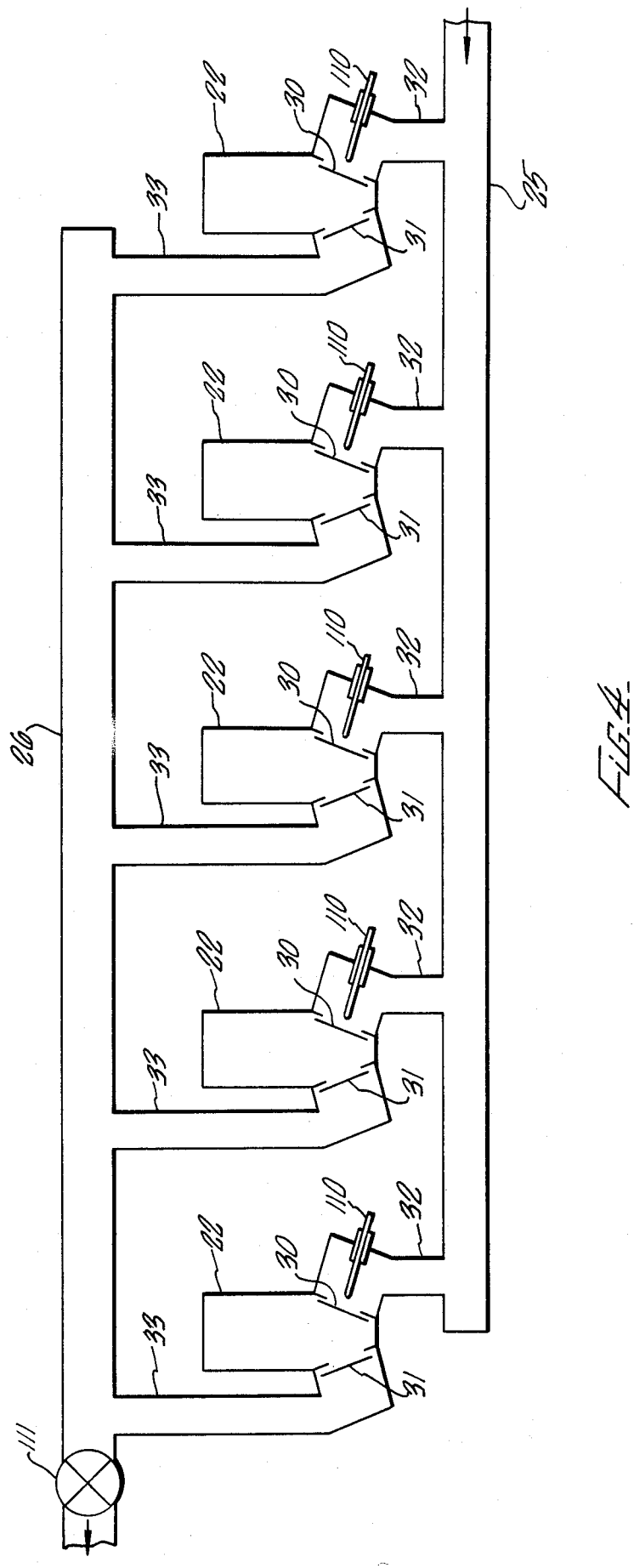
FIG. 4 is a diagrammatic illustration of a pumping arrangement employing idling means at the cylinder intake valves and constricting means in the common discharge line.

FIG. 4 illustrates a reciprocating piston pump arrangement employing idling means at the intake valves of the cylinders and constricting means in the common discharge line. In this embodiment intake valve 30 and discharge valve 31 to each cylinder 22 are check valves. A power actuated plunger or other means 110 is provided for holding valve 30 open, and the reciprocating piston 21 forces the hydraulic fluid back and forth from the inlet line 25. In an alternative arrangement the holding mechanism 110 can be operative with the discharge valve 31 and the fluid will be forced back and forth from the discharge line 26. With either of these methods that depend on holding open a cylinder valve 30 or 31, the cylinder could be idled without any simultaneous use of a constricting valve in the discharge line 33 from each cylinder 22.

The embodiment of FIG. 4 also illustrates the use of a single constricting valve 111, namely as the first constricting means, in the discharge line 26 carrying the combined flow from all cylinders 22. Constricting valve 111 in the line 26 provides the function of braking and locking of the wind rotor. An advantage of using one constricting valve 111 is that during braking it will increase the pressure on all cylinders 22 equally, whereas with a separate valve for each of the cylinders 22 it may be more complex for the control system to keep the pressures balanced. This could result in excessive stresses on certain cylinders 22, and the pistons 21 and their drives.

Figure 5:
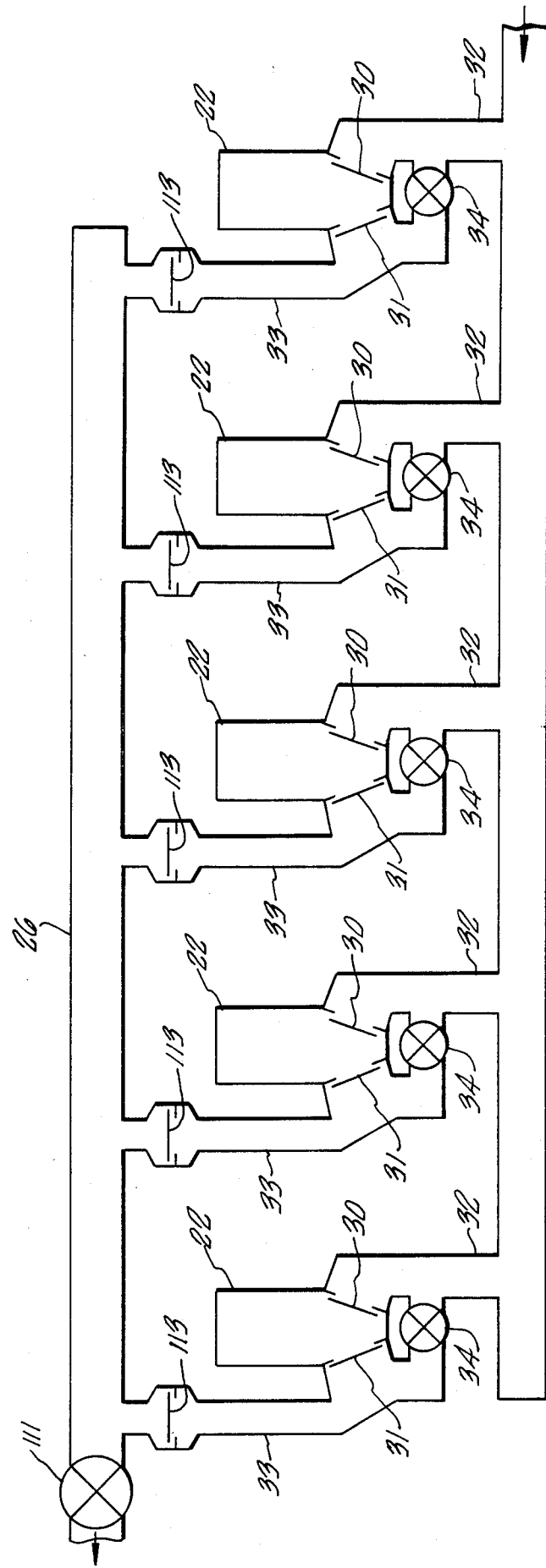
FIG. 5 is a diagrammatic view of another embodiment of a pumping arrangement employing an alternate method for cylinder idling.

FIG. 5 shows another embodiment that requires only a single power actuated constricting valve. It is here unnecessary to have means for holding cylinder valves 30 or 31 open, but instead between the inlet and discharge of each pump cylinder 22 there is a power driven idling valve 34. In this arrangement a check valve 113 as a second constricting means is placed in each cylinder discharge line 33. Another workable alternative would be to place check valve 113 in the inlet line 32. In either case the control system simply opens idling valves 34 to remove cylinders 22 from effective pumping and partially closes the constricting valve 111 when braking action is called for.

A further embodiment for regulating the wind rotor is achieved by idling the equivalent of fractions of one cylinder 22, namely providing at least one stage with a different capacity relative to remaining stages. It is standard practice in the use of reciprocating piston pumps to place annular liners in the cylinders 22 and reduce the diameter of the pistons 21 to match the liners, in order to change the pumping flow rate for a given drive shaft speed. Normally, of course, all cylinders 22 in a pump are treated the same when a change in rating is made by this method. However, not all cylinders 22 need to be treated the same, and this offers the possibility of greatly increased flexibility in the regulation of a coupled wind rotor 11.

As an exemplification, suppose the cross sectional area of only one cylinder 22 in a multi-cylinder pump were reduced 50% by the insertion of an appropriate liner and piston. That cylinder 22 when pumping would demand an average torque equal to one-half that of the others. This then would permit the use of the equivalent of half-integral steps in the average torque load on the wind rotor shaft 13. Idling that lined cylinder 22 would reduce the load by the equivalent of one-half of a cylinder. Then engaging the lined cylinder while idling another cylinder would reduce the load by the equivalent of another half of one cylinder, and so on. Thus a six cylinder pump with one cylinder lined in this way could be used to give eleven equal steps in the total torque demanded, assuming the pumping to be always against a constant pressure difference.

A practical problem that could arise when one or more cylinders of a reciprocating piston pump are idled, relates to the mechanical stresses caused by the uneven flow of fluid from the pump and the uneven torque applied to its drive shaft when cylinders are idled. These difficulties are overcome by periodic idling of all of the cylinders of the pump, so that they are all engaged in pumping or none are engaged in pumping. The average torque on the pump drive shaft, and the average discharge flow of the pump when pumping against a constant pressure difference, are then proportional to the fraction of the time that all cylinders are engaged in pumping.

In practice this is achieved by holding a valve, preferably the inlet valve 30, open. A solenoid actuated mechanical plunger 110 moves forward with the inlet valve plug on the suction stroke and locks in position holding that valve 30 open until the control system again engages the cylinder 22 in pumping. At that time the plunger 110 unlocks and is pushed back to its rest position by the valve plug at the beginning of the following discharge stroke. The cylinders 22 can be idled in crankshaft sequence by use of a distributor on the pump drive shaft. The distributor actuates the solenoids for idling, and again actuates solenoids at the cylinder valves in crankshaft sequence for resumed pumping. The result is that the total pump flow and crankshaft torque coast down smoothly when idling is induced, and increase smoothly when pumping is resumed. In the operational practice the average torque on the wind rotor shaft would be controlled not by idling different numbers of cylinders, but by idling a selected group of cylinders or all of the cylinders for different fractions of the time. This can work well in the wind power application because the wind rotor 13 also functions as a large flywheel. This again is a means for adjusting the torque on the shaft, but wherein the speed of the wind rotor is allowed to hunt around its optimum value for a given wind speed.

Aside from the benefit of allowing the pump to run smoothly and avoid periodic stresses that could lead to failure by mechanical fatigue, there are two other great advantages to this method. One is that the pump can be designed to operate at higher speed thereby reducing the cylinder diameter, length of piston stroke, connecting rod loading, and pump cost. The other advantage is that the control of average torque applied to the wind rotor shaft 13 is not limited to incremental steps as determined by the fraction of the number of cylinders that can be idled, but with this method can be made almost continuously variable. All or a selected group of the pump cylinders can be idled or engaged within one revolution of the pump crankshaft. That capability together with the rotational inertia provided by the wind rotor 13 permits very fine adjustments in the speed of the wind rotor. It follows, then, that the "speed ratio" can be held to its optimum value for efficient wind power conversion.

There is still another method of using valve control to partially idle and thereby vary the torque required to drive a multiple cylinder positive displacement pump. Since the pistons of different cylinders are operated in different phase relationships, opening a valve in a pipe that connects two cylinder chambers together has the effect of reducing the net discharge flow from the connected cylinders and the torque on the pump drive shaft.

Figure 6:
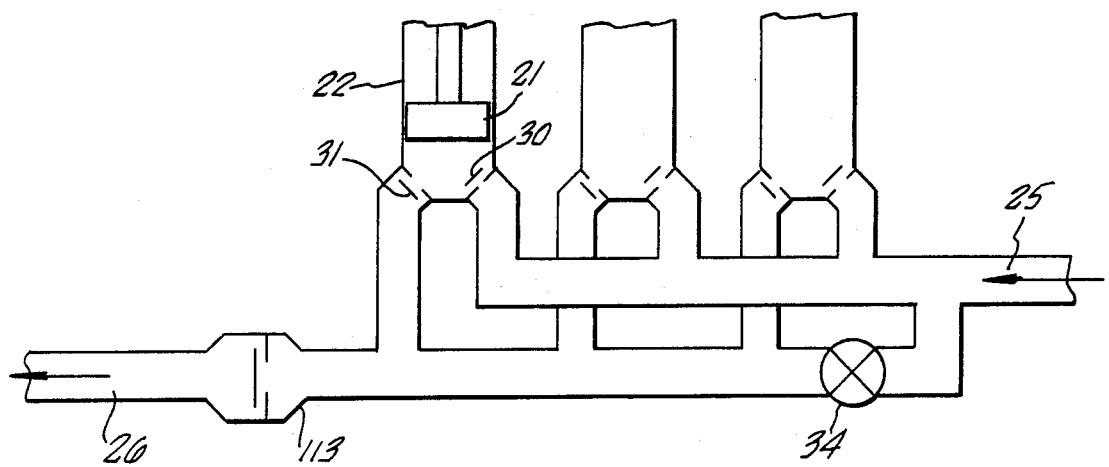
FIG. 6 is a diagrammatic view of an embodiment of a triplex pumping arrangement employing an alternate method for cylinder idling.
Figure 7:
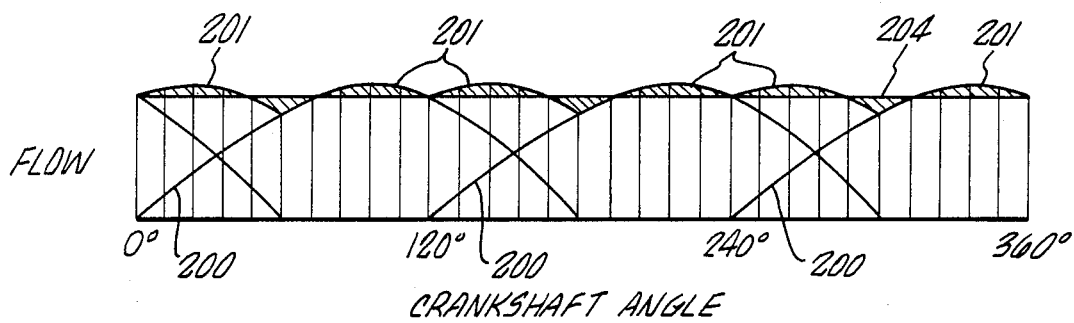
FIG. 7 is a graph illustrating the pump outputs from the triplex pumping arrangement of FIG. 6.

FIG. 6 illustrates an embodiment of the invention wherein there is employed a common idling valve 34 for a single-acting triplex pump. In order to reduce the size and cost of the pump by increasing its drive shaft speed the arrangement can be one where banks of cylinders 22 are idled thereby resulting in small fluctuations in instantaneous flow in the discharge 26. Flow from a triplex design is mostly constant as illustrated in the graph of FIG. 7. Since the flow into cylinders 22 has a similar time dependence as flow from the cylinders 22 there is only small back-and-forth flow fluctuation in the inlet line 25 during idling. The individual flow characteristics of each cylinder is shown by the sinusoidal curve 200 and the total flow from the pump by the curve 201, showing only small variations from the average flow which would be represented by the straight line 204. To take advantage of this characteristic, and keep the total number of pumping cylinders to a minimum, while still providing sufficient flexibility in the increments of torque demanded of the wind rotor shaft, several combinations can be considered. More than one pump can be coupled to the rotor shaft 13. All can be triplex, and either single-acting or double-acting. If double-acting, only the outboard end or the inboard end need be idled at a time.

A preferred choice among the different pump conbinations is that of two double-acting triplex pumps as illustrated in FIG. 8 in parallel with each other. A, B represents the first pump, and C, D represents the second pump, the C, D pump being three times the capacity rating of the A, B pump. This selection should result in the lowest cost for the combination. Only two triplex pumps are required, and the cylinder size for the largest pump C, D is lower than is the case for other combinations. An idling valve 34 would be installed between the inlet 25 and discharge 26 of each bank of ends of each of the pumps. The discharge line 26 from each bank would incorporate a check valve 113, and the single constricting valve 111 would be located in the common discharge line 26 from both pumps.

The table below illustrates how the four idling valves 34 are used to provide the eight equal incremental steps from zero to full pumping flow. Each bank of ends of the double-acting pumps A, B and C, D is given the letter designation used in the table.

| PUMPING BANKS ENGAGED | FRACTION OF PUMPING CAPACITY ENGAGED |
| --- | --- |
| A B C D | 1 |
| A C D | 7/8 |
| C D | 3/4 |
| A B C | 5/8 |
| A C | 1/2 |
| C | 3/8 |
| A B | 1/4 |
| A | 1/8 |
| None | 0 |

In other embodiments instead of a triplex pump, different multiple cylinder pumps can be employed, which may be double or single acting.

The recommended method of rotor speed control is illustrated in FIG. 10. Below a specified rotor speed 205 all cylinders 22 are idled and the rotor 11 is allowed to slowly spin in a low speed wind. When the rotor speed exceeds a selected value, one-eighth of the pumping capacity is engaged. The control system is designed to then wait for some specified time, of the order of one-half of a minute. At the end of that interval the control system compares the discharge flow rate and the rotor speed. If these values lie within the band of acceptable operating conditions, no action is taken. If the values lie to the left of the dashed curve 202 defining an edge of the acceptable band, one-eighth of the pumping capacity is idled. If the values should lie to the right of the solid curve 203 defining the other edge of the acceptable operating band, another one-eighth of the pumping capacity is engaged.

This process is repeated after each interval of time delay. It controls the rotor speed from the speed below which all cylinders are idled up to the rotor speed where all cylinders are engaged and the constricting valve holds the rotor speed constant at or below a selected maximum value 206.

The limiting operating condition, at high wind speed, occurs when the pump discharge pressure as measured by sensing means such as a transducer upstream of the constricting valve reaches some predetermined value. The constricting valve is then automatically gradually closed to slow and permit continued operation at a lowered speed ratio or to stall the rotor. Startup requires opening the constricting valve, idling all cylinders, and possibly using a startup motor to bring the rotor to sufficient initial speed for its automatic regulation. With this arrangement therefore the rotor speed is controlled over the entire range of wind speeds by measurements of the pump discharge pressure, discharge flow rate, and rotor speed.

Where it is necessary to provide some means of power-assist to bring the wind rotor up to an operational speed, the pump or a portion of it could be operated as a hydraulic motor making use of the pressure difference existing between discharge line 26 and inlet line 25. To provide for this, additional lines with appropriate valves must be arranged to connect the pump inlet to the discharge manifold and the pump discharge to the inlet manifold. Also the inlet valves 30 and discharge valves 31 on the cylinders participating cannot be simple check valves. Provision must be made for holding the discharge closed during the power stroke and the inlet closed during the return stroke.

It may be preferred to use a power-assist means separate from the pump. This could be a hydraulic motor drawing its power in the same way from the pressure difference existing between the discharge manifold 26 and the inlet manifold 25. Or it could be an electric motor driver. Whatever the mechanism, it could have its own idling means and be permanently geared to the rotor, or it could be clutched to drive the rotor when needed.

The apparatus and method of regulating the rotor speed of a wind machine, provides a simple and effective means for operating a wind machine to efficiently generate electricity from the wind. With the pumps in adjacency to the gear box and with the nature of the pumps providing idling of selected stages an effective means for converting wind to electricity efficiently is achieved which does not require complex rotor construction, and substantially eliminates problems of overspeed wind conditions and uses the minimum of control equipment to regulate the pumping of hydraulic fluid through the system. The need for variable hydraulic motor means, multiple pumps and energy accumulators in the hydraulic system is substantially overcome, and the power generated by the rotor, except for normal system losses, is translated directly and effectively through the hydraulic system to provide rotational power at the turbine.

In situations where it is desired to produce only mechanical rather than electrical power, the same arrangements as have been described but without the electrical generation can be used. Examples are land installations requiring mechanical power located near wind machines and ships requiring mechanical power for propulsion. In the latter case, rather than to use sails, one or more wind rotors with associated pumping means may be mounted on shipboard to provide the hydraulic fluid flow to power a turbine coupled to the ship's screw drive shaft. Such an arrangement permits the ship to be steered in any direction, independent of wind direction. For cruising in harbors or during other situations when the wind might result in excessive ship speed, the valve regulating means could idle more than the normal number of pumping stages so that the speed ratio would be too high for efficient wind power conversion, and still there would be no danger of rotor stalling. The ship speed could be further reduced by partial constriction by the valve constricting means on whatever stages were still engaged in effective pumping.

In some cases it may be necessary to incorporate heat exchange means to prevent overheating of the circulating fluid.

Although there has been shown and described the fundamental novel features of the invention as applied to preferred embodiments thereof, it will be understood that various ommissions and substitutions and changes in the form and the details of the invention illustrated and their operation may be made by those skilled in the art without departing from the spirit and scope of the invention, which should be limited only as indicated by the scope and the claims appended hereto.

I claim:

1. Apparatus for regulating the rotation of a wind responsive rotor of a wind machine comprising rotatable shaft means driven by a rotor thereby to be rotatable in response to wind action on the rotor, the shaft means being adapted to activate multistage pump means, each stage having intake means coupling a common fluid intake line with the stage and discharge means coupling a common fluid discharge line with the stage, first constricting means located in a discharge line from the stages, control means to regulate controllably the operative positions of the intake means or discharge means on selected stages and the first constricting means thereby to change the pumping status of the stages effectively pumping fluid between the intake line and discharge line, fluid being adapted to pass into and from all the selected stages thereby to vary controllably the torque on said shaft for a given shaft power transmitted thereby to permit regulation of the rotor rotational speed.

2. Apparatus as claimed in claim 1 including second constricting means located in series with said selected stages between the intake line or the discharge line, idling means permitting both the intake means and discharge means of the stages to communicate with either the fluid intake line or the fluid discharge line conversely to the location of the second constricting means with the intake line or discharge line, the control means acting to regulate controllably the operative positions of the first and, as appropriate the second constricting means, and the idling means to change the pumping status of selected stages effectively pumping fluid between the intake line and the discharge line, fluid being adapted to pass into and from all the selected stages thereby to vary controllably the torque on said shaft for a given shaft power transmitted thereby to permit regulation of the rotor rotational speed.

3. Apparatus as claimed in any one of claims 1 or 2 wherein the control means is adapted to regulate the rotor rotational speed to maintain, during normal wind conditions, a speed ratio between predetermined levels, and in overspeed wind conditions is adapted to controllably close at least partly the constricting means thereby to increase controllably the pressure on at least some of said selected stages and the torque on said shaft means and effect a speed regulation of said rotor.

4. Apparatus as claimed in either of claims 1 or 2 wherein each stage of the pump includes reciprocating piston means in cylinder means, and said constricting means, intake means and discharge means are valve means.

5. Apparatus as claimed in claim 2 wherein at least one of the intake means, discharge means, constricting means, or idling means is power activated valve means and other of said intake means, discharge means, constricting means or idling means in check valve means.

6. Apparatus as claimed in claim 4 wherein at least one stage is of different output capacity relative to the remaining stages.

7. Apparatus as claimed in claim 6 wherein the pump includes at least one multiple cylinder pump and common idling means for at least part of the pumping output capacity of the cylinders of the multiple cylinder pump.

8. Apparatus as claimed in claim 7 wherein the pump includes at least two multiple cylinder pumps in parallel.

9. Apparatus as claimed in claim 6 wherein the control means is adapted to effect idling or constriction of at least one stage, the pump means being operable with other stages which are not subject to idling or constriction.

10. Apparatus as claimed in claim 7 including means to effect periodic idling of selected groups or all of the stages during pump operation.

11. Apparatus as claimed in claim 7 including discharge flow rate sensing means, rotor speed sensor means, and pump discharge pressure sensor means, such discharge flow rate sensing means, rotor speed sensor means and pump discharge pressure sensor means being adapted to input signals to the control means thereby to facilitate regulation of the valve operation.

12. Apparatus as claimed in claim 4 wherein the shaft means includes at least two components, a first component being connected to the rotor and a second component being the pump drive shaft, the two components being operatively coupled to each other.

13. Apparatus as claimed in claim 12 wherein the operative coupling includes gear means.

14. Apparatus as claimed in claim 4 wherein the pump means is mounted in substantial adjacency with the shaft component from the rotor, thereby minimizing the drive distance between the rotor and the pump means.

15. Apparatus as claimed in anyone of claims 1 or 2 wherein the intake line and discharge line are adapted to be connected with a recirculating hydraulic system, such system including a hydraulic to mechanical power conversion means connected between said lines.

16. Apparatus as claimed in claim 15 wherein the hydraulic system is adapted to include valve means upstream of the hydraulic to mechanical energy conversion means and the system includes a high pressure fluid reservoir and a low pressure fluid reservoir connected to the system, such system being adapted to operate with a predetermined amount of gas in the fluid reservoirs thereby to facilitate substantially constant fluid pressures in the hydraulic system.

17. Apparatus as claimed in claim 15 wherein such conversion means is adapted to turn the rotor of an electrical generator.

18. Apparatus as claimed in claim 17 including such generator being a synchronous generator for generating electricity at a frequency substantially synchronous the mains supply frequency.

19. Apparatus as claimed in claim 4 wherein the rotor of the wind machine is fixed pitch.

20. Apparatus as claimed in claim 15 including several wind machines hydraulically coupled in parallel in the same hydraulic system.

21. A method of regulating the rotation of a wind responsive rotor of a wind machine having rotatable shaft means for rotation in response to wind action on the rotor, comprising activating multi-stage pump means with the shaft means, coupling a common fluid intake line and a common fluid discharge line through valve means with said stages, constricting said stages in the discharge from said stages, the valve means and said constricting being controllably regulated to change the pumping status of selected stages effectively pumping fluid between the common intake line and the common discharge fluid line while passing fluid into and from the selected stages thereby to vary controllably the torque on said shaft means and regulate the rotor rotational speed.

22. A method as claimed in claim 21 including constricting all the stages in the common discharge line and additionally constricting selected stages between the common discharge line and the common intake line, and further additionally selectively idling the stages conversely to operation of the additional constricting.

23. A method as claimed in either claim 21 or 22 including regulating the wind rotor shaft speed responsive to a predetermined speed ratio range.

24. A method as claimed in either of claims 21 or 22 including controlling all stages thereby selectively idling and constricting all said stages.

25. A method as claimed in claim 24 including periodically idling selected groups or all of the stages.

26. A method as claimed in claim 24 including sensing the fluid flow rate in the discharge line, rotor speed and pump discharge pressure and employing said sensing in controlling the regulation of the idling and constricting.

27. A method as claimed in either of claims 21 or 22 including converting fluid power to mechanical power.

28. A method as claimed in claim 27 including causing the mechanical power to turn a rotor of an electrical generator.

29. A method as claimed in claim 28 including generating electricity substantially synchronous to the mains supply frequency.

30. A method as claimed in claim 29 including coupling several wind machines to the fluid power converting system.

* * * * *